June 5, 1962

R. H. MERRICK 3,037,361

ABSORPTION REFRIGERATION SYSTEM

Filed July 7, 1958

2 Sheets-Sheet 1

INVENTOR.
RICHARD H. MERRICK

BY

*Herman Seid*

ATTORNEY.

United States Patent Office 3,037,361
Patented June 5, 1962

3,037,361
ABSORPTION REFRIGERATION SYSTEM
Richard H. Merrick, Tyler, Tex., assignor to Carrier Corporation, Syracuse, N.Y., a corporation of Delaware
Filed July 7, 1958, Ser. No. 746,931
4 Claims. (Cl. 62—101)

This invention relates to absorption refrigeration systems. More particularly, this invention relates to an improved absorber construction for use with absorption refrigeration systems.

The chief object of this invention is the provision of an absorber constructed to provide an efficient absorption action between refrigerant flowing from the evaporator and solution flowing from the generator.

Another object of the invention is the provision of an absorber wherein the absorption action desired occurs in a plurality of separate independent passages each connecting an upper and lower header member.

A further object of the invention is the provision of an absorber having a plurality of passages, wherein the desired absorption action occurs, exposed to a cooling medium for removing the heat of absorption.

A still further object of the invention is the provision of an absorber having a plurality of passages for accomplishing the desired absorbing action between solution and vaporous refrigerant in the system wherein flow of solution into each passage is automatically regulated so that the absorbing action in each passage is substantially constant.

Another object of the invention is the provision of a method of effecting the absorption of vaporous refrigerant from the evaporator by solution from the generator in an absorption refrigeration system.

Another object of the invention is the provision of an absorber including means for collecting solution flowing from the generator, means for collecting vapor from the evaporator, and means forming a plurality of passages emanating from the solution collecting means, said last means also communicating with the vapor collecting means so that vapor may flow in said passages and be absorbed by the solution flowing in the passages.

Figure 1:
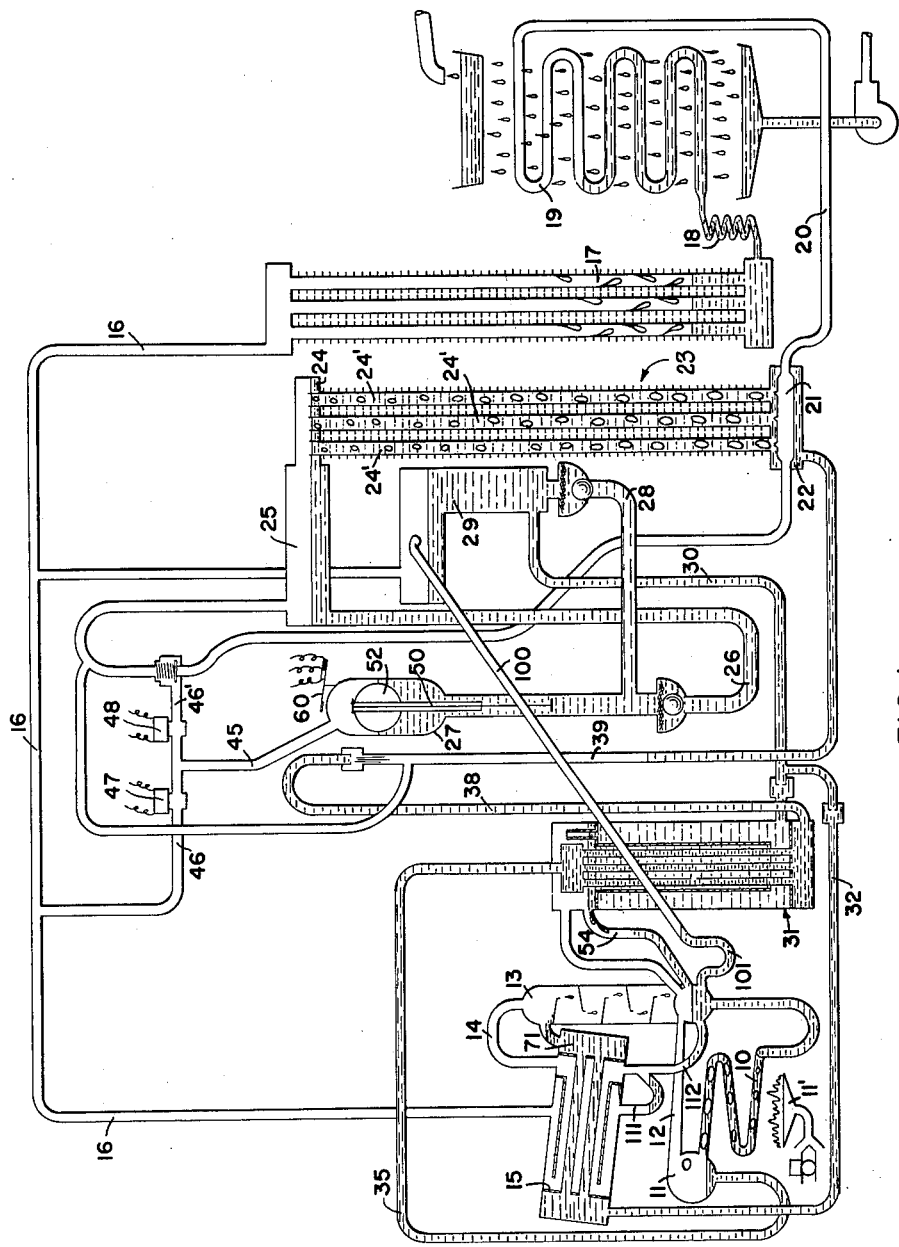
Figure 2:
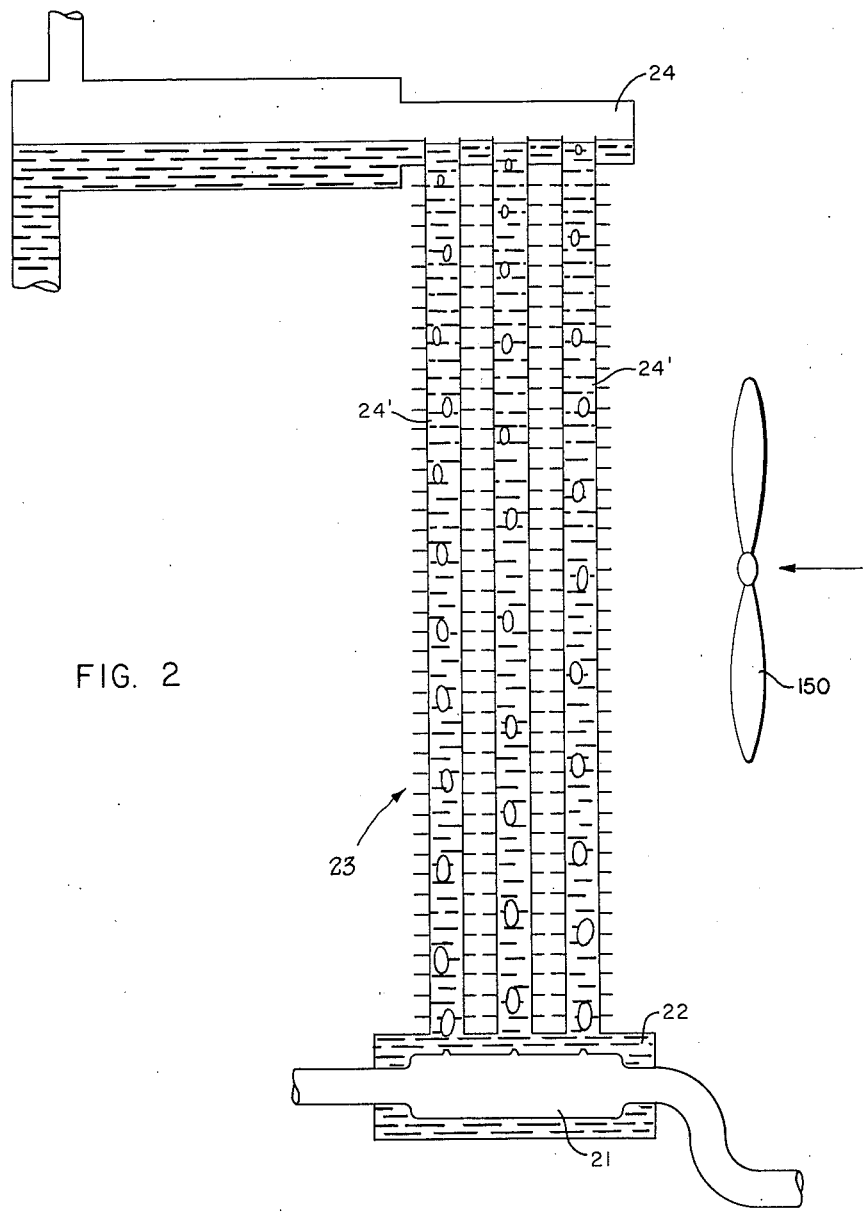

Other objects and features of the invention will be apparent upon a consideration of the ensuing specification and figures in which:

FIGURE 1 is a schematic view of an absorption refrigeration system including the improved absorber forming the subject invention; and FIGURE 2 is a view partly in section and partly in elevation of an absorber constructed in accordance with the invention.

For the purpose of illustrating the invention, reference may be had to FIGURE 1 which illustrates a refrigeration system of the absorption type to which this invention pertains.

Preferably the system described is charged with a solution of ammonia and water, with the ammonia acting as the refrigerant. In the system shown, heat from a burner 11' is supplied to the generator 10 having a solution of water and ammonia contained therein. A mixture of ammonia and water in the generator flows upward by virtue of a vapor lift action to a chamber 11 where the vaporous portion of the mixture is separated from the liquid portion. The vaporous mixture flowing from the chamber 11 through the line 12 contains portions of ammonia vapor as well as portions of water vapor.

The vaporous mixture flowing in line 12 enters analyzer 13 and flows upward through a tower portion of the analyzer where it is subjected to a heat transfer action of the conventional type normally associated with analyzers. In the analyzer, the vaporous mixture is subjected to a flow of solution in a manner to be more definitely described. This action has the effect of causing portions of the water vapor in the mixture to condense while causing portions of ammonia, flowing in the solution which is passed in heat transfer relation with the gas, to vaporize. The mixture, richer in refrigerant, flows through line 14 to the rectifier 15.

In the rectifier a second heat transfer action takes place between solution flowing in the solution circuit and the vapor flowing from the analyzer. From the rectifier, relatively pure ammonia vapor flows through line 16 to a condenser 17. In the condenser, the gaseous or vapor ammonia is liquefied as it gives up heat to a medium such as air flowing over the surface of the condenser. Liquid ammonia flows through restrictor 18 into evaporator 19. Here the refrigerant is once again converted into the vapor phase as heat from a medium such as water flows to the refrigerant located inside the coil 19. The vaporous refrigerant flows from coil 19 through line 20 back toward gas manifold 21 located within lower header 22 of absorber 23. The gaseous refrigerant bubbles out of the gas manifold 21, through openings located in the top thereof, into passages formed by tubular members 24' having communication with the lower header 22 and the upper header 24 of the absorber.

As is common to most absorption refrigeration systems, the vaporous refrigerant which has been absorbed by the solution in the absorber is transferred to the generator through the solution circuit for passage through the circuit just described. As pointed out above, the solution in the generator is heated and has a considerable portion of the refrigerant in solution driven off in the form of vapor. This leaves the solution which collects in chamber 11 deficient in refrigerant but possessed of good absorbing qualities. Therefore, it is known as a strong solution. The strong solution that has collected in chamber 11 flows through line 35 through a solution heat exchanger 31 where it gives up its heat to weak solution flowing from the absorber to the generator and then on through lines 38 and 39 to the lower solution header 22 of absorber 23.

As pointed out above, solution flowing upwardly in the tubes having communication with the lower header 22 absorbs gas flowing from the gas manifold and therefore the character of the solution at the upper header 24 of the absorber is such that it is relatively heavy in refrigerant, possessing poor absorbing qualities and therefore considered weak solution at this point of the solution circuit.

In order to transfer the weak solution from the upper portion of the absorber 24 to the generator where the process may be repeated, a solution transfer mechanism of the type described and claimed in my and Richard A. English's co-pending application, Serial No. 746,834, filed July 7, 1958, and assigned to the assignee of this application is provided. Briefly, the solution transfer mechanism involves a solution transfer vessel 27 having communication through leg 26 with a low side reservoir 25 which in turn is in communication with the upper header 24 of the absorber 23. Solution transfer vessel 27 is provided with operating mechanism designed to equalize the interior of the vessel with the high side and low side of the refrigeration systems alternatively. The parts are so arranged that when the vessel is equalized with low side pressure, weak solution flows by gravity from the reservoir 25 into the vessel 27 raising a float member 52 disposed within the vessel 27. When the float reaches the uppermost position within the vessel it carries with it a switch actuating member 50 which magnetically attracts a lever 60 carrying at one end thereof a capsule partially filled with mercury. Movement of the lever 60 is sufficient to complete a circuit through two conductors which will close the valve 48 in line 46' and open valve 47 in line 46. It will be noted that both lines 46 and 46' communicate with the interior of the vessel through common line 45. Under these circumstances the interior of the vessel 27 is subjected to high side pressure. The parts are so arranged that under these circumstances liquid collected within the vessel 27 is free to flow by gravity downwardly through a portion of line 26 and line 28 to high side reservoir 29. The weak solution collected in vessel 29 is free to flow through line 30 to either the heat exchanger 31 or through line 32 to the rectifier 15 and the analyzer 13 to perform the heat transfer actions described above. That portion of the refrigerant flowing through line 30 into the heat exchanger 31 flows via line 54 to the lower portion of the analyzer where it flows by gravity to the generator 10. The solution which has flown through the rectifier and the analyzer likewise collects in the analyzer and is transmitted to the generator by gravity. In order to prevent an abnormal collection of refrigerant in the high side reservoir 29, overflow pipe 100 is shown connected to the lower portion of the analyzer. A liquid seal is provided in this line by virtue of the trap 101 formed in line 100 adjacent its connection with the analyzer. Suitable traps are formed in connections between the rectifier and analyzer as indicated in lines 111 and 112. Here the function is to prevent vapor in line 14 from bypassing the central heat transfer chamber of the rectifier 15.

Considering the invention reference may be had to FIGURE 2 which shows the absorber serving as the subject of this invention, in detail. As pointed out above a strong solution collects in the lower header 22 of the absorber and flows upwardly through a series of tubes 24' connecting the lower header 22 and the upper header 24. Preferably these tubes are vertically aligned and in spaced relation with one another and each is arranged so as to receive vapor issuing from the vapor header 21 disposed with the solution header 22. The heat of the absorption is carried away by air or any other medium moving across the outer surface of the tubes under the influence of a fan 150. Preferably the absorber is so designed that the complete absorption occurs shortly before the solution reaches the top of the header 24. Movement of the solution upwardly through the tubes is under the influence of a vapor lift type action.

By causing the absorption action required, to occur in a series of confined passages, it is possible to obtain a complete, efficient, even absorption of the vapor from the refrigerant by the solution. The purpose of the multiple passages is to segregate the solution into small sections which are adequately spaced so that a high volume cooling media such as air may be brought into efficient heat transfer relationship with the solution. The degree of absorption occurring in any one tube is directly related to the density of the solution-vapor mixture in that tube. Under those circumstances where an excessive amount of absorption may occur in one tube that particular tube will have a solution-vapor mixture, the character of which is more dense that the solution existing in the other tubes. This creates a greater resistance to the flow of solution from the lower header 22 into the tube causing instead the solution to follow the path of least resistance, namely one or more of the other tubes.

Thus a self-balancing effect may be obtained with an absorber constructed in accordance with the teachings of this invention.

With the construction shown in FIGURE 2 it is possible to obtain a complete and efficient absorption action. Other constructions falling within the scope of this invention will suggest themselves to those skilled in the art.

While I have described preferred embodiments of the invention, it will be understood the invention is not limited thereto since it may be otherwise embodied within the scope of the following claims.

I claim:

1. In an absorption refrigeration system the combination including a generator, a condenser, an evaporator, an absorber comprising a lower header for receiving solution from the generator, an upper header spaced from said lower header, a plurality of spaced tubular members connecting the headers and providing a passage for solution flowing from the lower header to the upper header, means forming an enclosure for the accumulation of vapor from the evaporator, within said lower header, said enclosure means being provided with openings in substantial alignment with the tubular members for the escape of vapor into the tubes containing the solution to be absorbed thereby.

2. An absorber for absorbing refrigerant in the gaseous phase into a liquid solution of refrigerant and absorbent in an absorption refrigeration system comprising a lower header for receiving solution from the generator of the absorption refrigeration system, an upper header spaced from the lower header, a plurality of spaced hollow members connecting the headers and providing a passage for solution flowing from the lower header to the upper header, means within the lower header forming an enclosure for the accumulation of vapor from the evaporator of the system, said means having openings in substantial alignment with the hollow members for the escape of vapor into the hollow members containing the solution to be absorbed thereby, and means for directing cooling medium in heat exchange relation with solution in the hollow members.

3. In a method of effecting absorption of refrigerant vapor by an absorbent solution in an absorption refrigeration system the steps which consist in collecting solution having strong absorbing characteristics in a header, supplying the collected solution in a plurality of upwardly extending paths, collecting refrigerant vapor from the evaporator in an enclosure placed in said header and discharging the vapor in substantially equal proportions from the enclosure upwardly through the plurality of upwardly extending paths whereby the vapor is absorbed by the solution during passage through the upwardly extending paths.

4. A method of effecting absorption of refrigerant vapor by an absorbent solution in an absorption refrigeration system according to claim 3 which includes the step of cooling the solution in said paths to dissipate the heat generated by the absorption of the vapor by the solution.

References Cited in the file of this patent

UNITED STATES PATENTS

| | | |
|---|---|---|
| 1,659,681 | Davenport | Feb. 21, 1928 |
| 2,248,178 | Kuenzli | July 8, 1941 |
| 2,350,249 | Osborn | May 30, 1944 |
| 2,440,583 | Hainsworth | Apr. 27, 1948 |
| 2,592,712 | Knoy | Apr. 15, 1952 |

FOREIGN PATENTS

| | | |
|---|---|---|
| 735,163 | Germany | May 10, 1943 |